United States Patent
Umrao et al.

(10) Patent No.: US 12,174,864 B1
(45) Date of Patent: Dec. 24, 2024

(54) AUTOMATIC INTELLIGENT QUERY SUGGESTION FOR INFORMATION RETRIEVAL APPLICATIONS

(71) Applicant: FMR LLC, Boston, MA (US)

(72) Inventors: Sachin Umrao, Bengaluru (IN); Manish Gupta, Bengaluru (IN); Matthew McGrath, Manchester, NH (US); Bibhash Chakrabarty, Bengaluru (IN); Sorin Roman, Hampton Falls, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/374,165

(22) Filed: Sep. 28, 2023

(51) Int. Cl.
*G06F 16/33* (2019.01)
*G06F 16/332* (2019.01)
*G06F 40/20* (2020.01)

(52) U.S. Cl.
CPC ...... *G06F 16/3322* (2019.01); *G06F 16/3329* (2019.01); *G06F 40/20* (2020.01)

(58) Field of Classification Search
CPC .............. G06F 16/332; G06F 16/9535; G06F 16/24578; G06F 16/248; G06F 16/3328; G06F 16/335; G06F 3/04842; G06F 16/242; G06F 16/3322; G06F 16/3338; G06F 16/73
See application file for complete search history.

(56) References Cited

U.S. PATENT DOCUMENTS

| | | | |
|---|---|---|---|
| 10,853,103 B2 | 12/2020 | Zhu et al. | |
| 11,086,858 B1 * | 8/2021 | Koukoumidis | H04L 67/5651 |
| 11,475,053 B1 | 10/2022 | Das et al. | |
| 11,625,450 B1 | 4/2023 | Roman et al. | |
| 2012/0265787 A1 * | 10/2012 | Hsu | G06F 16/36 |
| | | | 707/E17.014 |
| 2017/0154125 A1 | 6/2017 | Balakrishnan et al. | |
| 2018/0239829 A1 * | 8/2018 | Dialani | G06Q 10/1053 |

(Continued)

OTHER PUBLICATIONS

R. Sennrich et al., "Neural Machine Translation of Rare Words with Subword Units," Proceedings of the 54th Annual Meeting of the Association for Computational Linguistics, Aug. 2016, 11 pages.

(Continued)

*Primary Examiner* — Mark Villena

(74) *Attorney, Agent, or Firm* — Cesari and McKenna, LLP

(57) ABSTRACT

Methods and apparatuses are described for automatic intelligent query suggestion for information retrieval applications. A server a) determines candidate intents associated with user input text received from a remote device, including applying a trained intent classification model to the user input text to predict candidate intents. The server b) calculates a likelihood value for each of the candidate intents. The server c) compiles a list of suggested queries based upon the candidate intents and associated likelihood values. The server d) identifies a subset of the list of suggested queries for display on the remote device. Upon detecting an update to the user input text at the remote device, the server repeats steps a) to d) using the updated user input text, or upon detecting a selection of one of the suggested queries at the remote device, the server retrieves content responsive to the selected query.

28 Claims, 8 Drawing Sheets

(56) References Cited

U.S. PATENT DOCUMENTS

| | | |
|---|---|---|
| 2021/0042136 A1 | 2/2021 | Zhu et al. |
| 2021/0286851 A1* | 9/2021 | Kota .................. G06N 5/04 |
| 2021/0397788 A1 | 12/2021 | Yim |
| 2023/0029420 A1* | 1/2023 | Rusnak ............ G06F 16/90324 |
| 2023/0394038 A1* | 12/2023 | Shahrokh Esfahani ................... G06N 3/045 |

OTHER PUBLICATIONS

A. Radford et al., "Language Models are Unsupervised Multitask Learners," OpenAI, 2019, 24 pages.

C.D. Manning et al., Introduction to Information Retrieval, Cambridge University Press (2008), Online Edition (c) 2009, pp. 234-265.

"Levenshtein Distance," Wikipedia, available at https://en.wikipedia.org/wiki/Levenshtein_distance, retrieved on Jan. 3, 2024, 8 pages.

* cited by examiner

| User Input Text 402 | Top Candidate Intents 404 | Top Query Suggestions 406 |
|---|---|---|
| "applying" | 1. Options apply<br>2. Credit card general<br>3. Information loans | 1. Enable put buying<br>2. Help paying off a loan<br>3. Credit card payment |
| "applying for" | 1. Options apply<br>2. Terms of withdrawal<br>3. Credit card general | 1. Enable put buying<br>2. Apply for Visa Credit Card<br>3. Terms of withdrawal |
| "applying for options" | 1. Options apply<br>2. Can I open a 529<br>3. Margin overview | 1. How do I apply for options trading?<br>2. Margin call actions<br>3. 529 plan for my kids |
| "applying for options trading" | 1. Options apply<br>2. Extended hours trading setup<br>3. Margin overview | 1. How do I apply for options trading?<br>2. Setting up margin trading<br>3. How to begin after hours trading? |

FIG. 4

AUTOMATIC INTELLIGENT QUERY SUGGESTION FOR INFORMATION RETRIEVAL APPLICATIONS

TECHNICAL FIELD

This application relates generally to methods and apparatuses, including computer program products, for automatic intelligent query suggestion for information retrieval applications.

BACKGROUND

Information retrieval computing applications and platforms—such as chatbots, search engines, virtual assistant applications, interactive voice response (IVR) systems, and voice-activated smart devices—are deployed in many different facets of daily life. Such applications are typically reactive, meaning that the applications do not have any significant prior knowledge of the intent behind an incoming user interaction, the user's needs, and/or user-specific attributes (such as demographics and user profile data). As one example, interactions with existing virtual assistant (VA) applications in a typical customer service setting are conducted without any understanding of the customer's intent or reason behind initiating the interaction. For example, a user may be browsing an enterprise's website to look for certain information that is responsive to a particular need—but the user may struggle to find the answers he or she wants. Upon activating a VA application in the browser software, the customer may be greeted with a default message that simply asks the user to provide a query (e.g., describe the information that they are seeking). Upon providing the query, the VA application may classify the query to a predefined intent and provide one or more answers or suggestions for content based upon the predefined intent.

However, this approach suffers from several significant drawbacks, including:
1) Less robust intent classification. Users can enter the same or similar query in many different ways and in different styles, and typical VA systems are unable to handle such differences in input text. This leads to the generation of inaccurate or error-prone intent classification, which degrades the user experience.
2) Users are shown answers/suggestions without confirming with the user whether the predefined intent is accurate. This oversight not only results in a less-than-optimal user experience (i.e., users are shown answers/suggestions unrelated to their query), but also makes the VA conversation longer and more frustrating.
3) Intent classification is based solely on the input text entered by the user. This approach does not consider any other available information about the user and/or the user's prior activity (e.g., digital activity on web/app, tasks and transactions done in the past, and profile attributes)—which results in less accurate intent predictions.
4) Lack of continuous learning and model retraining using historical interaction data.

SUMMARY

Therefore, what is needed are methods and systems that apply advanced machine learning algorithms and techniques to intelligently predict intent behind user interactions and provide customized, curated query suggestions based upon input text provided by the user. The techniques described herein further enable adjustment of predicted user intents and corresponding query suggestions based upon real time input provided by the user—as the user updates the input text, the system advantageously re-evaluates the text input to determine new user intents and identify the most relevant suggested queries for user review and selection.

In addition, the methods and systems assist users in phrasing queries, such as when users do not know the right question to ask or the right terminology to use. Instead of entering text that is not relevant to the user's desired outcome, the technology described herein reduces the typing required from the user and gets relevant results in front of user with lesser time and/or effort. Also, when training the model, data augmentation methods are employed which introduce misspellings in training data. This makes the model more robust to typing mistakes from users when typing a query and better matches the typing patterns of users. As can be appreciated, virtual assistant applications and similar customer interaction systems are required to be updated as business needs evolve—such as launching a new product or removing a service. As a result, new suggestions and intents get added to the system, while some suggestions and intents get deprecated. The systems and methods described herein take these nuances into account and provide an automatic retraining pipeline to support retraining the model on recent logs and customer features.

The invention, in one aspect, features a computer system for automatic intelligent query suggestion for information retrieval applications. The system includes a server computing device having a memory for storing computer-executable instructions and a processor that executes the computer-executable instructions. The server computing device a) determines a plurality of candidate intents associated with user input text received from a remote computing device, including applying a trained intent classification model to the user input text to predict one or more of the candidate intents. The server computing device b) calculates a likelihood value for each of the plurality of candidate intents. The server computing device c) compiles suggested queries based upon the plurality of candidate intents and associated likelihood values. The server computing device d) identifies one or more suggested queries for display on the remote computing device. Upon detecting an update to the user input text at the remote computing device, the server computing device repeats steps a) to d) using the updated user input text, or upon detecting a selection of one of the suggested queries at the remote computing device, the server computing device retrieves content responsive to the selected query for display on the remote computing device.

The invention, in another aspect, features a computerized method of automatic intelligent query suggestion for information retrieval applications. A server computing device a) determines a plurality of candidate intents associated with user input text received from a remote computing device, including applying a trained intent classification model to the user input text to predict one or more of the candidate intents. The server computing device b) calculates a likelihood value for each of the plurality of candidate intents. The server computing device c) compiles suggested queries based upon the plurality of candidate intents and associated likelihood values. The server computing device d) identifies one or more suggested queries for display on the remote computing device. Upon detecting an update to the user input text at the remote computing device, the server computing device repeats steps a) to d) using the updated user input text, or upon detecting a selection of one of the suggested queries at the remote computing device, the server computing device retrieves content responsive to the selected query for display on the remote computing device.

Any of the above aspects can include one or more of the following features. In some embodiments, determining a plurality of candidate intents comprises identifying one or more prior interactions between the user of the remote computing device and one or more information retrieval applications, inferring one or more intents associated with the prior interactions, and incorporating the inferred intents into the plurality of candidate intents. In some embodiments, calculating a likelihood value for each of the plurality of candidate intents comprises predicting a likelihood value for each candidate intent by executing a trained intent likelihood prediction model using the plurality of candidate intents as input to generate the likelihood values. In some embodiments, determining a plurality of candidate intents comprises identifying one or more intents associated with interactions between one or more information retrieval applications and other users, and incorporating the identified intents into the plurality of candidate intents. In some embodiments, calculating a likelihood value for each of the plurality of candidate intents comprises predicting a final set of candidate intents by executing a trained intent likelihood prediction model using the plurality of candidate intents as input to generate the likelihood values.

In some embodiments, the likelihood value for each of the plurality of candidate intents represents a likelihood that the candidate intent matches an actual intent of the user of the remote computing device. In some embodiments, compiling suggested queries based upon the plurality of candidate intents and associated likelihood values comprises identifying, for each candidate intent, one or more suggested queries that are mapped to the candidate intent, assigning a ranking value to each of the suggested queries based upon (i) a text similarity measure with the user input text and (ii) the likelihood value for the corresponding candidate intent, and sorting the suggested queries using the ranking value to compile the suggested queries. In some embodiments, identifying one or more suggested queries for display on the remote computing device comprises selecting one or more of the suggested queries based upon the ranking value, generating a user interface element comprising the selected suggested queries, and transmitting the user interface element to the remote computing device.

In some embodiments, the server computing device automatically retrains the trained intent classification model. In some embodiments, retraining the trained intent classification model comprises generating a training data set using (i) historical interactions associated with one or more information retrieval applications and (ii) active intent information, retraining the trained intent classification model using the training data set, and validating the retrained intent classification model using a validation data set.

In some embodiments, the user input text comprises an incomplete text string and the update to the user input text comprises an addition to the incomplete text string. In some embodiments, the content responsive to the selected query comprises a webpage for display in a browser application on the remote computing device. In some embodiments, the server computing device redirects the browser application to the webpage upon detecting the selection of one of the suggested queries from the remote computing device. In some embodiments, steps a) to d) occur in real time as updates to the user input text are detected at the remote computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of exemplary user input text strings, candidate user intents, and query suggestions.

DETAILED DESCRIPTION

Figure 1:
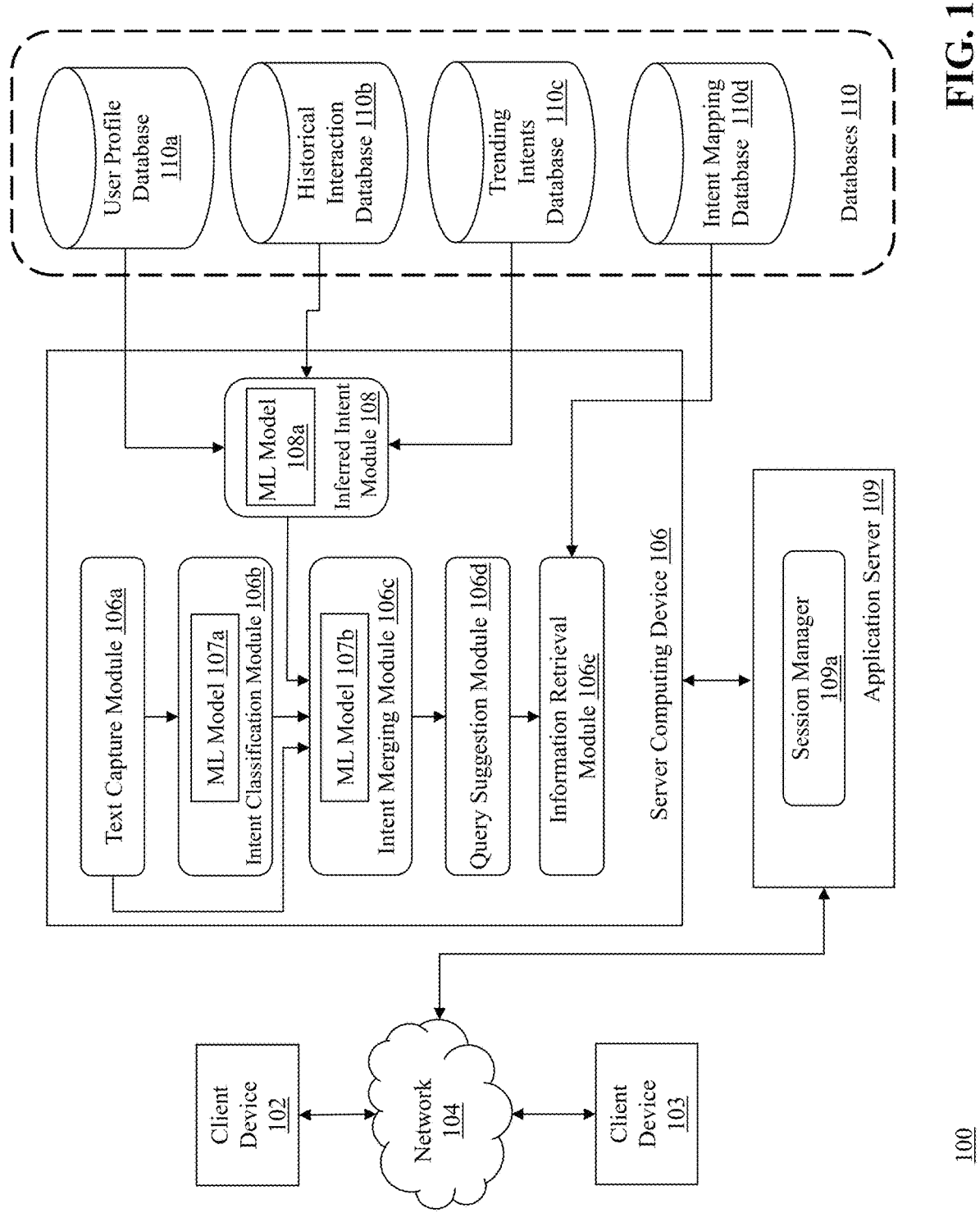
FIG. 1 is a block diagram of a system for automatic intelligent query suggestion for information retrieval applications.

FIG. 1 is a block diagram of a system 100 of automatic intelligent query suggestion for information retrieval applications. System 100 includes client computing device 102, client computing device 103, communication network 104, server computing device 106 that includes text capture module 106a, intent classification module 106b with machine learning (ML) model 107a, intent merging module 106c with ML model 107b, query suggestion module 106d, information retrieval module 106e, and inferred intent module 108 with ML model 108a. System 100 further comprises application server computing device 109 that includes session manager 109a. System 100 also comprises a plurality of databases-including user profile database 110a, historical interaction database 110b, trending intents database 110c, and intent mapping database 110d.

Client computing devices 102, 103 connect to communication network 104 in order to communicate with web server 109 to participate in one or more information retrieval sessions. As can be appreciated, application server 109 can be configured to host one or more applications and/or connect to other computing devices that provide retrieval of content for presentation on client computing devices 102, 103. In some embodiments, application server 109 is a web server that provides webpages and other related content to client computing devices 102, 103. For example, client computing devices 102, 103 can establish a communication session with session manager 109a of application server 109 (e.g., via HTTP or HTTPS) using a uniform resource locator (URL) assigned to application server 109 and receive website content from application server 109. A user at client computing device 102, 103 can interact with (e.g., browse) the website by activating links, typing in textual input, and navigating through various pages of the website. In some embodiments, each page or section of the website is associated with a particular URL. In some embodiments, client computing devices 102, 103 are each coupled to an associated display device (not shown). For example, client computing devices 102, 103 can provide a graphical user interface (GUI) via the display device that is configured to receive input from a user of the corresponding device 102, 103 and to present output (e.g., website content) to that user. In one example, a user at client computing device 102, 103 may begin typing text into an input field displayed in a UI and server computing device 106 can detect the input of text from the user. In some embodiments, application server 109 is a virtual assistant (VA) server that provides VA application functionality to client computing devices 102, 103. For example, client computing devices 102, 103 can be hardware devices configured to receive spoken input and/or text input from a user of the devices 102, 103. Application server 109 can interpret the spoken and/or text input using, e.g., one or more natural language understanding (NLU) or natural language processing (NLP) algorithms and retrieve content that is responsive to the input. In some embodiments, client computing devices 102, 103 can be configured to connect to server computing device 106 via network 104.

Exemplary client computing devices 102, 103 include but are not limited to desktop computers, laptop computers, tablets, mobile devices, smartphones, smart home devices, smart speakers, and/or internet appliances. It should be appreciated that other types of computing devices that are capable of connecting to the components of system 100 can be used without departing from the scope of invention. Although FIG. 1 depicts two client computing devices 102, 103, it should be appreciated that system 100 can include any number of client computing devices.

Communication network 104 enables client computing devices 102, 103 to communicate with application server 109. Network 104 is typically a wide area network, such as the Internet and/or a cellular network. In some embodiments, network 104 is comprised of several discrete networks and/or sub-networks (e.g., cellular to Internet). In some embodiments, client computing devices 102, 103 can also connect directly to server computing device 106.

Server computing device 106 is a device including specialized hardware and/or software modules that execute on one or more processors and interact with one or more memory modules of server computing device 106, to receive data from other components of system 100, transmit data to other components of system 100, and perform functions for automatic intelligent query suggestion for information retrieval applications as described herein. Server computing device 106 includes text capture module 106a, intent classification module 106b, intent merging module 106c, query suggestion module 106d, information retrieval module 106e, and inferred intent module 108 that execute on one or more processors of server computing device 106. Intent classification module 106b includes machine learning (ML) model 107a. Intent merging module 106c includes ML model 107b. Inferred intent module 108 includes ML model 108a. In some embodiments, modules 106a-106e, 108 and models 107a-107b, 108a are specialized sets of computer software instructions programmed onto one or more dedicated processors in server computing device 106 and can include specifically designated memory locations and/or registers for executing the specialized computer software instructions.

Although modules 106a-106c, 108 and models 107a-107b, 108a are shown in FIG. 1 as executing within the same server computing device 106, in some embodiments the functionality of modules 106a-106e, 108 and models 107a-107b, 108a can be distributed among a plurality of server computing devices. As shown in FIG. 1, server computing device 106 enables modules 106a-106e, 108 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106e, 108 and models 107a-107b, 108a is described in detail throughout the specification.

In some embodiments, machine learning models 107a-107b, 108a are artificial intelligence frameworks or algorithms configured to receive specifically formatted input data and generate corresponding output. In some embodiments, ML model 107a comprises a classification model configured to receive user input text from one or more client computing devices 102, 103 and predict one or more candidate intents (e.g., reason(s) that the user may have initiated the interaction with application server 109) based upon the user input text. As can be appreciated, in some embodiments the predicted candidate intents may look different than the user input text (which is typically a partially typed user query). It should be understood that, in this sense, ML model 107a can be considered an 'autosuggest' model, i.e., showing the best matching suggestions for a partially typed user query—in contrast to prior approaches that use an 'autocomplete' paradigm, which is just a prediction of what the user intends to type next.

In some embodiments, ML model 107b comprises an intent prediction model configured to receive candidate intents from intent classification module 106b and/or candidate intents from one or more databases 110a-110d and generate predicted likelihood values for each candidate intent. In this case, the likelihood value represents a likelihood that the candidate intent matches an actual intent of the user at client computing device 102, 103 in initiating the interaction.

In some embodiments, ML model 108a comprises an artificial intelligence framework configured to receive data from databases 110a-110c (including data that is representative of user activity, such as a clickstream or other interactive activity) as input and generate a prediction of user need/intent based upon the data. In these embodiments, ML model 108a predicts user intent without any knowledge of the text typed by the user but instead utilizing user profile features, historical interaction features, and trending interaction features as provided from databases 110a-110c. For example, ML model 108a can comprise one or more machine learning frameworks or algorithms that are executed on the input data to determine predictions of user need/intent based upon the input. In some embodiments, the input data comprises aggregated feature embeddings. Additional detail regarding the structure and functionality of inferred intent module 108 and ML model 108a is described in U.S. Pat. No. 11,625,450, titled "Automated Predictive Virtual Assistant Intervention in Real Time," which is incorporated by reference herein.

Exemplary classification model frameworks that can be used in ML models 107a, 107b, and 108a include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), Naïve Bayesian classification, and others. As can be appreciated, machine learning models 107a, 107b, and 108a can be trained on existing data and correlated known outcomes in order to enhance the accuracy of the prediction values generated by models 107a, 107b, and 108a. Also, as additional data and related known outcomes are collected by system 100 over time, this additional data can be used to re-train models 107a, 107b, and 108a for a further increase in accuracy and performance.

Application server 109 is a computing device (or set of computing devices) to which client computing devices 102, 103 can connect to retrieve and display information (e.g., digital content items such as documents, files, web pages and similar information) that is responsive to a request submitted by the user and/or responsive to an intent of the user. Application server 109 is a combination of hardware, including one or more special purpose processors and one or more physical memory modules, and specialized software modules (such as session manager 109a) that are executed by a processor of application server 109.

In some embodiments, application server 109 comprises a web server that hosts and makes available one or more websites. Typically, a website comprises a plurality of visual and non-visual elements that make up the content transmitted and displayed to a user when, e.g., browser software on client computing devices 102, 103 connects to application server 109 via communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a website is associated with a particular URL that identifies the page's location and provides a mechanism for retrieving the page for display on client computing devices 102, 103. Session manager 109a is configured to establish browsing sessions with client computing devices 102, 103 and record session-related information (such as pages visited, URLs accessed, timestamps, page sequencing, and the like) for each user/client device. In some embodiments, session manager 109a records the browsing session information in user profile database 110a and/or historical interaction database 110b. In one example, application server 109 provides a search interface that is configured to receive text input from client computing devices 102, 103 and scan one or more information repositories, databases, or indexes to identify and retrieve responsive information.

In some embodiments, application server 109 comprises a virtual assistant (VA) server that provides one or more VA applications for use by client computing devices 102, 103. Typically, a user at client computing devices 102, 103 launches an app or skill to interact with a VA application provided by server 109. The user can provide input (e.g., in the form of spoken audio or typed text) that is interpreted by server 109 to determine content items to retrieve in response to the input. Exemplary VA applications include, but are not limited to, personal assistant applications (such as Alexa® available from Amazon, Inc.), chatbots, interactive voice response (IVR) systems.

Databases 110a-110d are located on a computing device (or in some embodiments, on a set of computing devices) coupled to server computing device 106 and/or web server 109 and databases 110a-110d are configured to receive, generate, and store specific segments of data relating to the process of automatic intelligent query suggestion for information retrieval applications as described herein. In some embodiments, all or a portion of databases 110a-110d can be integrated with server computing device 106, web server 109, or be located on a separate computing device or devices. Databases 110a-110d can comprise one or more databases configured to store portions of data used by the other components of system 100 as will be described in greater detail below.

In some embodiments, user profile database 110a comprises user profile information for a plurality of users of system 100; typically, each user is associated with one or more client computing devices 102, 103. User profile information can include, but is not limited to, identification information (e.g., user identifiers, account numbers) demographic information, financial information, device information (e.g., IP address, MAC address, or device identifier of client computing device 102, 103), and the like.

In some embodiments, historical interaction database 110b comprises historical user interaction/user event data that may be correlated to user profiles as stored in user profile database 110a. Generally, historical interaction database 110b can comprise information about prior actions/interactions of users (e.g., purchases, requests for information, appointments, account setup, transactions, and customer service interactions) across one or more channels (e.g., voice call, text chat, email, web browsing). As can be appreciated, historical interaction database 110b can also store information relating to prior predicted or determined intents for a plurality of users as determined by system 100 based upon corresponding user input text.

In some embodiments, trending intents database 110c comprises information associated with predicted or determined intents for users at client computing devices 102, 103 over time. Many users may interact with system 100 during a prescribed period of time and system 100 can capture the predicted intents as identified for those users. System 100 can then analyze the predicted intent data to determine whether there are any noteworthy similarities, signals, or findings that can be derived from the intents between groups of users and/or during the period of time. For example, system 100 can determine that a particular intent was predicted a large number of times by system 100 for many different users during the relevant time period. In this example, system 100 can flag this intent as a trending intent and leverage this information when generating intent predictions and likelihood values for subsequent users (as will be explained in detail below). In some embodiments, database 110c can also be configured to capture and store trending intent information from one or more other interaction channels, such as: inbound and/or outbound calls, searches performed on mobile apps or websites, conversations with virtual assistant agents (e.g., chatbots) and live agents, and other modes of interaction such as emails or surveys.

In some embodiments, intent mapping database 110d comprises information that associates one or more user intents to one or more suggested queries. For example, based on input text of "Applying" as provided by a user, system 100 may determine one of the predicted user intents as "Credit Card"—i.e., determining that the user may be interested in applying for a credit card. Based upon the predicted intent, system 100 can retrieve one or more suggested queries from database 110d that are mapped to the intent—such as "Apply for new credit card," "Credit card application FAQ," and so forth.

Figure 2:
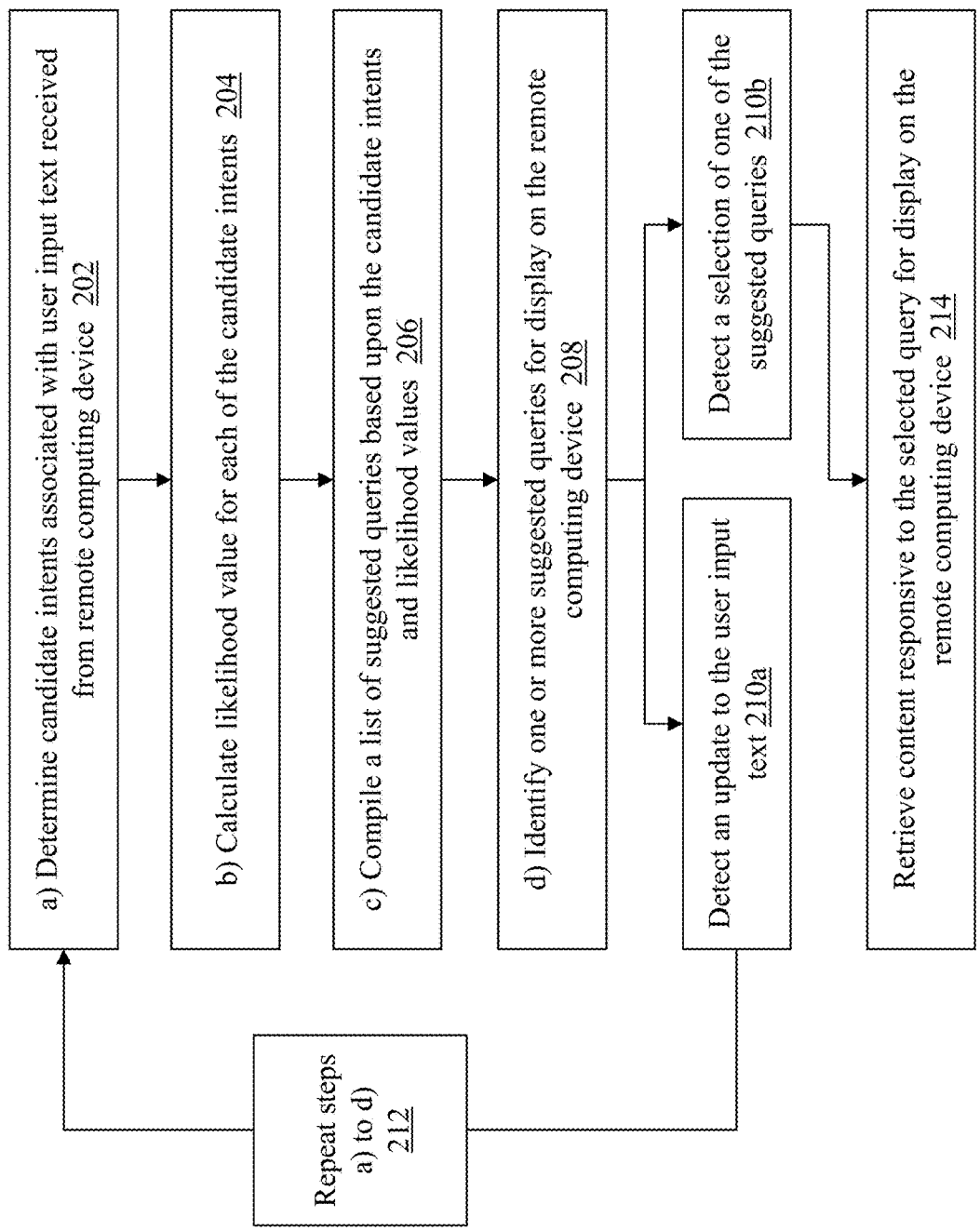
FIG. 2 is a flow diagram of a computerized method of automatic intelligent query suggestion for information retrieval applications.

FIG. 2 is a flow diagram of a computerized method 200 of automatic intelligent query suggestion for information retrieval applications, using system 100 of FIG. 1. As mentioned above, users at one or more client computing devices 102, 103 can initiate and participate in information retrieval sessions with application server 109. During these sessions, session manager 109a can detect and/or record information provided by the user of client computing devices 102, 103—such as input provided by the user (such as typed text or spoken words), and/or interactions initiated by the user (such as button clicks) with one or more UI elements displayed on client computing device 102, 103. For example, client computing device 102, 103 can present a search interface to the user via a browser application, including a text input field, and the user can begin typing text into the text input field. Session manager 109a can detect one or more keystrokes and/or entry of one or more characters in the text input field and text capture module 106a can receive the input text for analysis in determining user intent. In some embodiments, text capture module 106a can receive a partial text string from session manager 109a—a fully formed user input string is not required. For example, in the process of typing "Applying for a new credit card." the user may have entered the first five letters, "Apply." At this point, system 100 can analyze the user input text in real time to determine intent and provide query suggestions even though the input string is not complete. And, after each entry of a subsequent character—i.e., "Applyi," "Applyin," "Applying." system 100 can repeat the steps for determining intent and providing query suggestions as described herein, which beneficially provides automatic refinement of the intent determination in real time for improved accuracy.

As text capture module 106a receives the user input text from application server 109, text capture module 106a can convert the user input text into a format that is compatible for ingestion by ML model 107a of intent classification module 106b. In some embodiments, text capture module 106a performs a data pre-processing and cleaning routine on the incoming user input text. During the data pre-processing and cleaning routine, text capture module 106a performs one or more tasks on the unstructured user input text to ensure that the text is in a form that can be used as input for model 107a. Exemplary pre-processing and cleaning tasks performed by the module 110 can include, but are not limited, to removing whitespaces, masking personal information, replacing contractions, and removing stopwords, Text capture module 106a can also pass certain features of the user input text (e.g., length of user typed query) to intent merging module 106c directly.

After text capture module 106a has completed the pre-processing and cleaning the unstructured user input text, intent classification module 106b converts the user input text into tokens for processing by ML model 107a. Generally, tokenization comprises converting the user input text into a plurality of tokens. As can be appreciated, a token is a fundamental unit that a text processing system typically works with—in some implementations, each token corresponds to a word in the input text. Advantageously, by tokenizing the user input text, ML model 107a can predict user intents without requiring complete or grammatically correct input sentences. In one example, intent classification module 106b uses byte pair encoding to tokenize the input text—as described in R. Sennrich et al., "Neural Machine Translation of Rare Words with Subword Units," *Proceedings of the 54th Annual Meeting of the Association for Computational Linguistics*, August 2016 and A. Radford et al., "Language Models are Unsupervised Multitask Learners," OpenAI, 2019, both of which are incorporated herein by reference.

Intent classification module 106b determines (step 202) a plurality of candidate intents associated with the user input text. In some embodiments, the determination of candidate intents by module 106b can comprise several different processes, including: 1. Execution of ML model 107a on the present tokenized input text to predict candidate intents; 2. Inference of candidate intents using inferred intent module 108 and ML model 108a based upon prior interactions between the user (and/or other users) and one or more information retrieval applications. The candidate intents from one or more of the above processes can be evaluated by intent merging module 106c and ML model 107b to determine a subset of candidate intents from which suggested queries are identified, as will be described in detail below.

1. Execution of ML Model 107a—in this process, intent classification module 106b executes ML model 107a using the tokenized user input text to predict probabilities of intents corresponding to the input text. As described above, the user input text typically comprises a partially typed user query—such as "how do I trad") which is converted to a sparse vector using, e.g., a Term Frequency-Inverse Document Frequency (TF-IDF) Vectorizer (as will be described in greater detail below). ML model 107a predicts a likelihood of each intent label. For example, before modelling, all intents are converted to numerical labels using a Label Encoder (described in greater detail below), which contains the mapping from the text form of the intent to its numerical label. After the prediction is generated by ML model 107a, the probabilities corresponding to each encoded intent are decoded to a string format using the Label Encoder. In some embodiments, ML model 107a is a classification algorithm configured to generate a likelihood score for each label value given the user input text, where the label corresponds to a particular user intent. Intent classification module 106b produces a vector of the probability of each intent $(i_1, i_2 \ldots, i_n)$ determined only using the typed text (where the size of the vector is equal to the number of the intents). In one example, the algorithm used in intent classification module 106b and ML model 107a is a Naïve Bayesian classifier, as described in C. D. Manning et al., "Introduction to Information Retrieval," Cambridge University Press (2008), pp. 234-265, which is incorporated herein by reference. In some embodiments, the Naïve Bayesian classifier provides for a number of technical advantages, including: a) Naïve Bayes has a fewer number of model parameters and has low latency, which is an important requirement in the 'autosuggest' framework described herein because the intent inference occurs at each user keystroke (other model types may have higher latency); b) Naïve Bayes works with sparse vectors, which further enables lowering the latency (other classical ML algorithms may not work with sparse vectors, and produce lower accuracy and higher latency); and c) Naïve Bayes works well with partially typed user queries where it utilizes joint probability distributions of words and intents from historical logs data to predict the likelihood of intents. It should be appreciated that other algorithms can be used within the scope of the technology described herein.

2. Inference of Candidate Intents from Prior Interactions with the User and/or Other Users—in this process, inferred intent module 108 executes ML model 108a to leverage relevant user profile information (from, e.g., database 110a), historical interaction data for the user (from, e.g., database 110b), and trending intent information (from, e.g., database 110c) and identify one or more candidate intents. In some embodiments, module 108 retrieves user profile information from database 110a—such as demographic data, account data, and similar data elements. Module 108 also retrieves historical interaction data from database 110b—such as prior interaction data (e.g., channel, transaction type, date, time). Module 108 also retrieves trending intent data from database 110c—such as the most frequent intents for a plurality of users as determined over a recent period of time. Based on the retrieved information, module 108 can generate a feature set for the user and utilize ML model 108a to determine one or more candidate intents based upon the feature set—as described in U.S. Pat. No. 11,625,450, titled "Automated Predictive Virtual Assistant Intervention in Real Time," which is incorporated by reference herein When intent merging module 106c has collected the candidate intents from intent classification module 106b and/or identified candidate intents from inferred intent module 108, and numerical attributes of the user input text from text capture module 106a, as described above, intent merging module 106c calculates (step 204) a likelihood value for each of the plurality of candidate intents. Intent merging module 106c executes trained intent likelihood prediction ML model 107b on the plurality of candidate items as input to calculate the likelihood value for each candidate item. In some embodiments, intent likelihood prediction ML model 107b comprises an artificial intelligence algorithm such as a recursive neural network (RNN), a convolutional neural network (CNN), or other type of neural network architecture that comprises a plurality of layers (e.g., input layer, one or more hidden layers, output layer) configured to receive as input a machine-readable aggregation of the user input text and the plurality of candidate intents, and generate a predicted likelihood value based upon the machine-readable aggregation—that is, model 107b is configured to determine (or predict) a relationship between the features and/or attributes of the user input text and each corresponding candidate user intent that had been identified. Generally, model 107b is measured by how accurately it can predict the output from the corresponding input-a less accurate model can be retrained using the same training data (and/or additional training data) in order to refine the model and make it more accurate. In some embodiments, the likelihood value for each candidate intent comprises a numeric value (e.g., between 0 and 1) that represents how likely it is that the candidate intent matches the user's actual intent in initiating the present interaction—for example, likelihood values closer to 1 indicate a stronger likelihood of a match between candidate intent and actual intent, while values closer to 0 indicate a weaker likelihood of a match.

Figure 3:
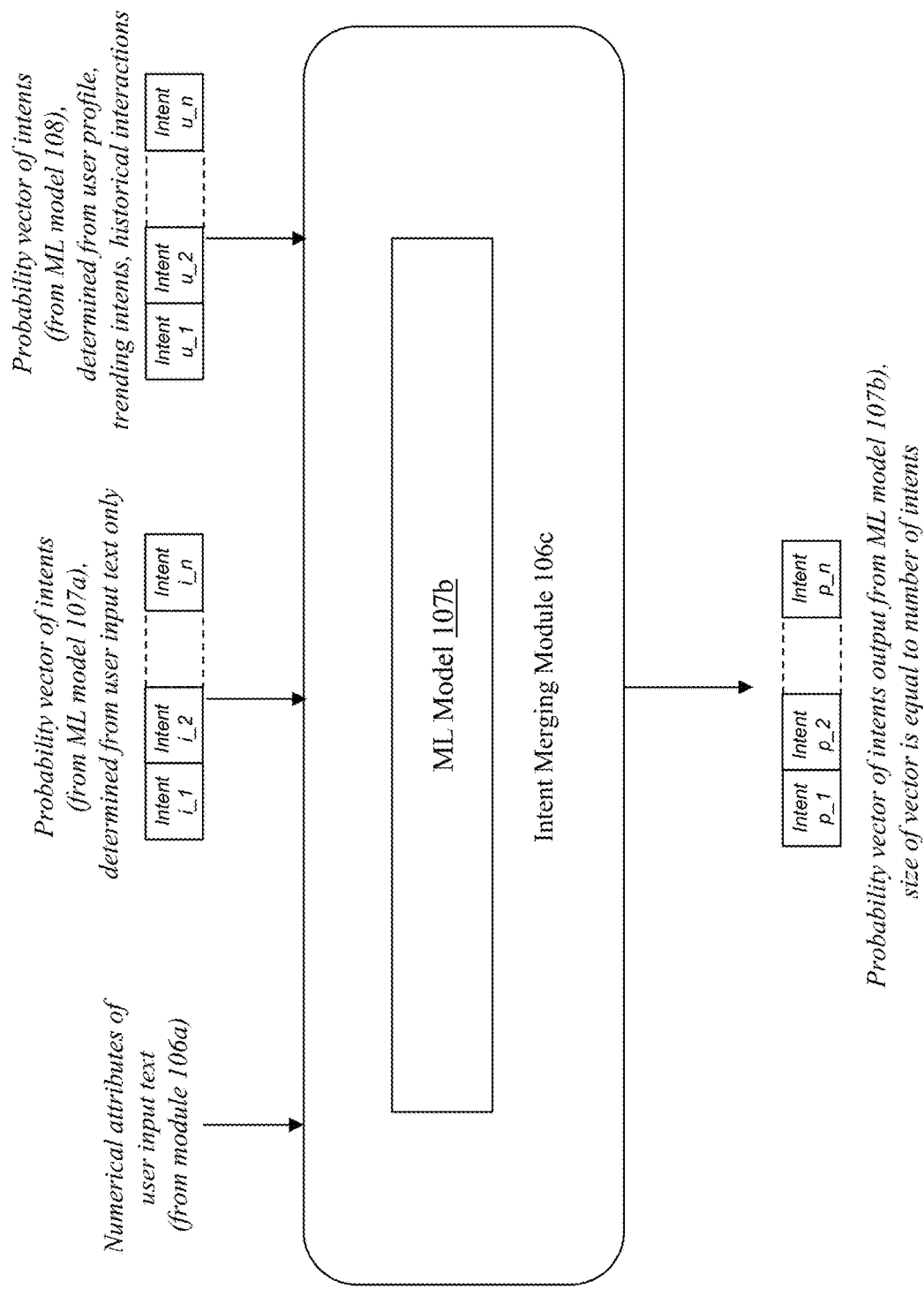
FIG. 3 is a detailed block diagram of an intent merging module with exemplary inputs and outputs.

FIG. 3 is a detailed block diagram of intent merging module 106c and ML model 107b. As shown in FIG. 3, model 107b model combines the intent probabilities determined using (a) what the customer typed (the output of ML model 107a); (b) what is inferred from user profile information, trending intents and historical interactions (the output of ML model 108a); and (c) numerical attributes of the user input text received from text capture module 106a. Specifically, the inputs to ML model 107b are: 1) output from model 107a, which is a vector of the probability of each intent ($i\_1, i\_2 \ldots i\_n$) determined only using the typed text (where the size of the vector is equal to the number of the intents); 2) output from model 108, which is a vector of the probability of each intent ($u\_1, u\_2 \ldots, u\_n$) determined from the user profile information, trending intent information and historical user interaction information (where the size of the vector is equal to the number of the intents); and 3) numerical attributes (e.g., length of the user typed text) received from text capture module 106a. All three inputs are passed as input features to ML Model 107b which predicts a final likelihood of each intent. Based upon the predicted likelihood values, system 100 selects a subset of intents (e.g., top-n intents). In some embodiments, system 100 converts the selected subset of intents (which are numerical values) to the corresponding text values using the Label Encoder as described above.

Using the candidate intents and associated likelihood values as generated by model 107b, query suggestion module 106d of server computing device 106 compiles (step 206) a list of query suggestions based upon the candidate intents and likelihood values. Each candidate intent is associated with one or more query suggestions as stored in intent mapping database 110d. Generally, a query suggestion is a preconfigured text string that comprises a question, an action, or other similar indicia that, when submitted to an information retrieval application, causes the information retrieval application to return information that is pertinent to the indicia. In some embodiments, query suggestion module 106d identifies a subset of the candidate intents for retrieval of query suggestions. For example, module 106d can select the top-n unique candidate intents (ranked according to the likelihood values) and retrieve one or more query suggestions from database 110d corresponding to each of the top-n unique candidate intents.

It should be appreciated that, in some embodiments, each candidate intent may have multiple associated query suggestions. To select one query suggestion that is the best match to the candidate intent, query suggestion module 106d can utilize a similarity measure algorithm to find a preferred matching suggestion. In some embodiments, module 106d utilizes an edit distance-based matching algorithm for the similarity measure, which provides lower latency for determination of query suggestions and enables system 100 to provide updated suggestions in real time. An exemplary edit distance-based matching algorithm that can be used by module 106d to find a matching query suggestion is the Levenshtein Distance algorithm, as described at en.wikipedia.org/wiki/Levenshtein_distance.

Query suggestion module 106d can filter and/or rank the retrieved query suggestions using, e.g., a similarity measure between the user input text string and the query suggestion string. The ranking process can include assigning a ranking value to each of the retrieved query suggestions. For example, query suggestions that have more words/phrases in common with the user input text can be ranked higher than query suggestions that have fewer words/phrases in common with the user input text. Query suggestion module 106d can sort the ranked query suggestions according to, e.g., the ranking value. FIG. 4 is a diagram of exemplary user input text strings 402, candidate user intents 404, and query suggestions 406 as determined by modules of server computing device 106.

Figure 5A:
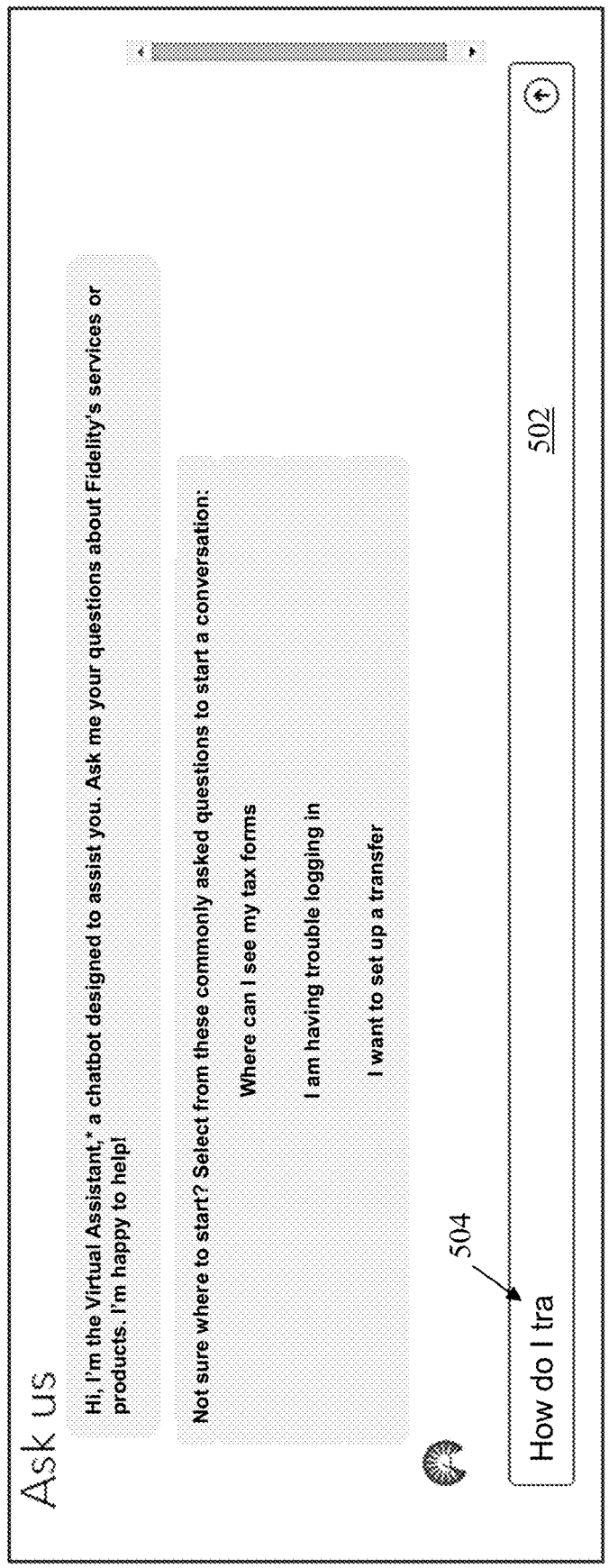
FIGS. 5A and 5B are diagrams of an exemplary virtual assistant user interface screen generated using query suggestions for display on client computing devices.
Figure 5B:
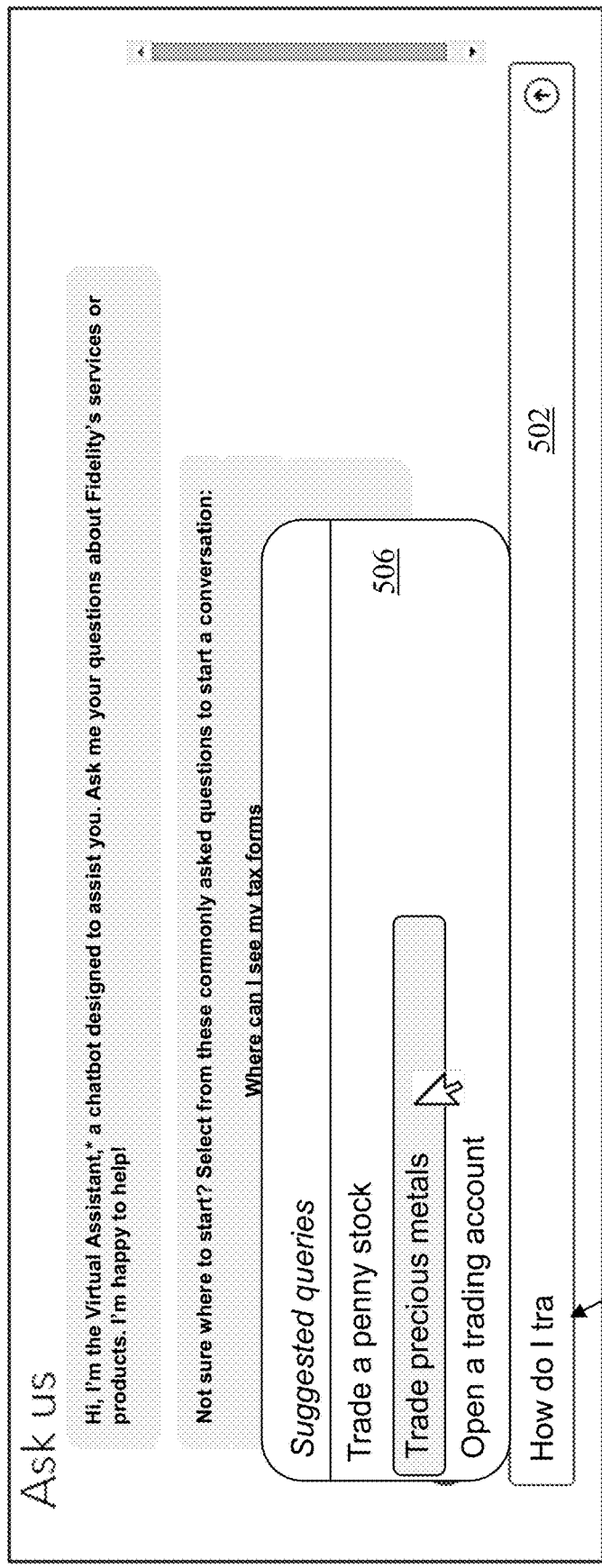

Query suggestion module 106d identifies (step 208) one or more suggested queries for display on client computing device 102, 103 in response to the user input text. For example, as mentioned above query suggestion module 106d can rank the query suggestions and identify a subset of the query suggestions (e.g., top-n based on ranking value or all query suggestions that have a ranking value above a threshold) for display to the user at client computing device 102, 103. Instead of inundating the user with all possible query suggestions, this approach advantageously presents a limited number of query suggestions that system 100 has determined will return information most closely matching the predicted user intent. FIGS. 5A and 5B are diagrams of an exemplary virtual assistant user interface screen 500 generated using the query suggestions from module 106d for display on client computing devices 102, 103. As shown in FIG. 5A, user interface 500 includes search input field 502 that contains a partial user input text string 504 (i.e., "How do I tra") as typed by user of client computing device 102, 103. As the user types the text input, modules 106a-106d. 108 of server computing device 106 capture the text, determine candidate user intents, and identify query suggestions based upon the input text as described above. Upon identifying one or more query suggestions, module 106d generates a user interface element that displays the query suggestions automatically in user interface 500. As shown in FIG. 5B, user interface element 506 comprises a pop-up window that contains three different query suggestions: "Trade a penny stock." "Trade precious metals." "Open a trading account." The user at client computing device 102, 103 can view the query suggestions and determine whether to (i) interact with one of the suggestions (e.g., by clicking the suggestion) to access information relating to the query suggestion or (ii) continue typing in the input field 402. When the user interacts with one of the suggestions, it may indicate that user feels the suggestion aligns with their intent for initiating the search. When the user continues typing, it may indicate that the user feels none of the displayed suggestions align with their intent.

Figure 6:
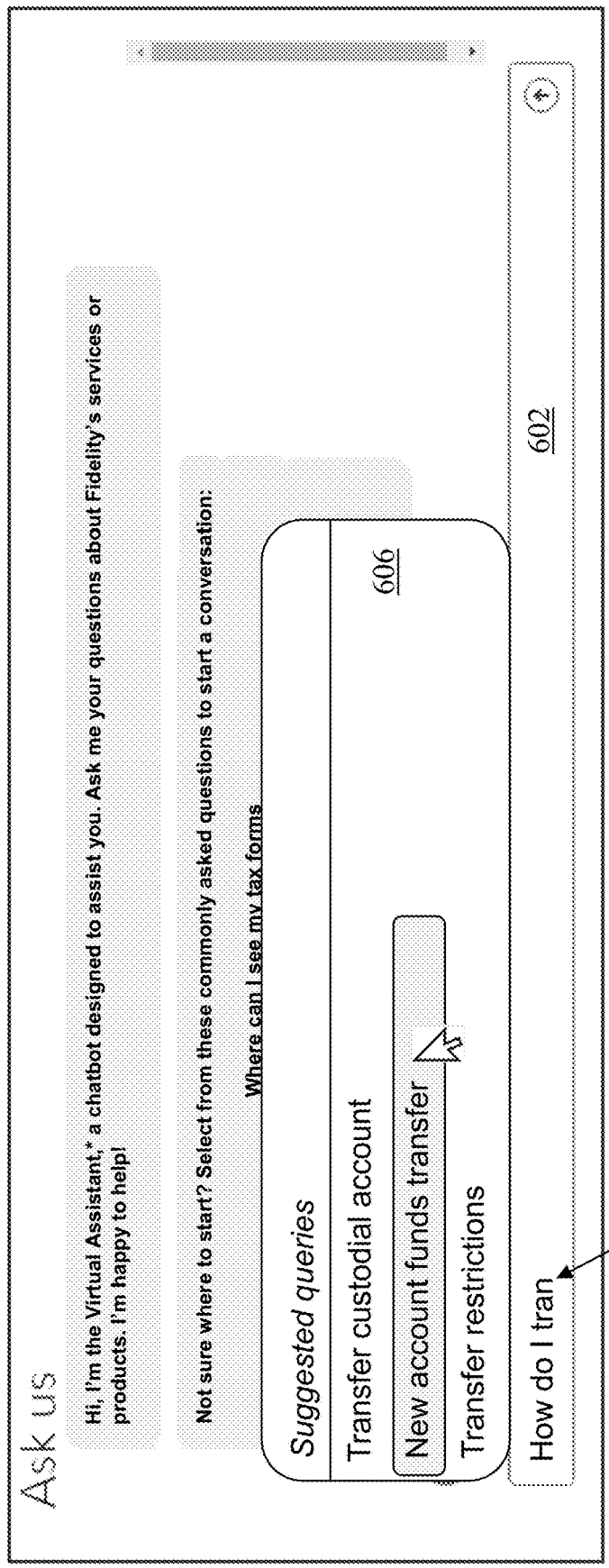
FIG. 6 is a diagram of an exemplary user interface screen generated with new query suggestions based upon updated user input text.

If the user continues typing, session module 109a of application server 109 detects (step 210a) an update to the user input text and provides the updated user input text to text capture module 106a. An update may comprise the addition of one or more characters to the user input text—continuing with the example of FIGS. 5A and 5B, the user may update the input text string to "How do I tran." Server computing device 106 receives the updated input text and modules 106a-106d. 108 repeat (step 212) the process of determining candidate intents at step 202, calculating likelihood values at step 204, compiling suggested queries at step 206, and identifying one or more suggested queries for display at step 208 of FIG. 2. It should be appreciated that in some embodiments, the repeating of steps 202 to 208 can occur in real time, so that as the user types each additional character, server computing device 106 automatically updates the user interface element containing the query suggestions with a new set of suggestions based upon the updated input text. FIG. 6 is a diagram of an exemplary user interface screen 600 generated with new query suggestions from module 106d based upon updated user input text. As shown in FIG. 6, the user at client computing device 102, 103 has updated the input text string 604 to "How do I tran" from "How do I tra" (as shown in FIGS. 5A and 5B). The changed input text string causes server computing device 106 to determine another plurality of candidate intents and likelihood values, and compile and display suggested queries on client computing device 102, 103 dynamically. The user interface element 606 in FIG. 6 shows query suggestions that are different from the query suggestions displayed in FIG. 5B, because the input text has changed and system 100 has processed the changed input text according to the steps 202-208 in FIG. 2. As can be appreciated, the user at client computing device 102, 103 can continue to make changes to the input text and view different query suggestions in real time.

When the user selects one of the displayed queries, session module 109a of application server 109 detects (step 210b) the selection and provides the selected query to server computing device 106. Information retrieval module 106e retrieves (step 214) content responsive to the selected query for display on the client computing device 102, 103. For example, module 106o can determine that content responsive to the selected query includes a webpage. Module 106c can capture a URL corresponding to the webpage (e.g., by retrieving the URL from an information repository) and redirects a browser application on client computing device 102, 103 to the URL for the webpage upon detecting the selection of one of the suggested queries.

An important facet of the intent determination and query suggestion process described herein is the ability of system 100 to identify and display suggested queries that does not employ an 'autocomplete' process. As is generally understood, existing search interfaces provide functionality for autocompletion of a text string as a user is typing. Most often, these search interfaces attempt to extrapolate or predict the specific words that the user is typing—for example, when a user types "applying for opt," traditional autocomplete systems may provide the following choices: 1) "applying for options," 2) "applying for options trading" or 3) "applying for options trading account." These choices have a significant degree of overlap and may not correspond to information for which the user is actually searching. As an improvement over such autocomplete systems, the methods and systems described herein beneficially predict the most likely distinct intents that correspond to the user input and then select one or more suggested queries based upon the intents-thereby maximizing the chance that the user sees a suggestion that is relevant and useful to the interaction. In some embodiments, the intent determination and query suggestion process performed by system 100 is tailored specifically to the user based upon, e.g., prior interactions and/or user profile information-enabling system 100 to make accurate intent predictions and query suggestions even with fewer characters in the user input text received from client computing device 102, 103.

Another important facet of the intent determination and query suggestion process described herein is the deployment of a trained intent classification model (i.e., model 107a of intent suggestion module 106a) to predict user intent from partially typed input text. As can be appreciated, it is beneficial to retrain model 107a periodically based upon updated knowledge regarding intents and suggestions as captured by system 100 over time. The methods and systems described herein advantageously utilize an auto-trainable model pipeline to retrain the model 107a with recent user interaction data. The auto-trainable model pipeline also has data augmentation capability to improve model performance with respect to less-frequently encountered intents (where there may not be sufficient historical interaction data for the model to accurately learn from).

Figure 7:
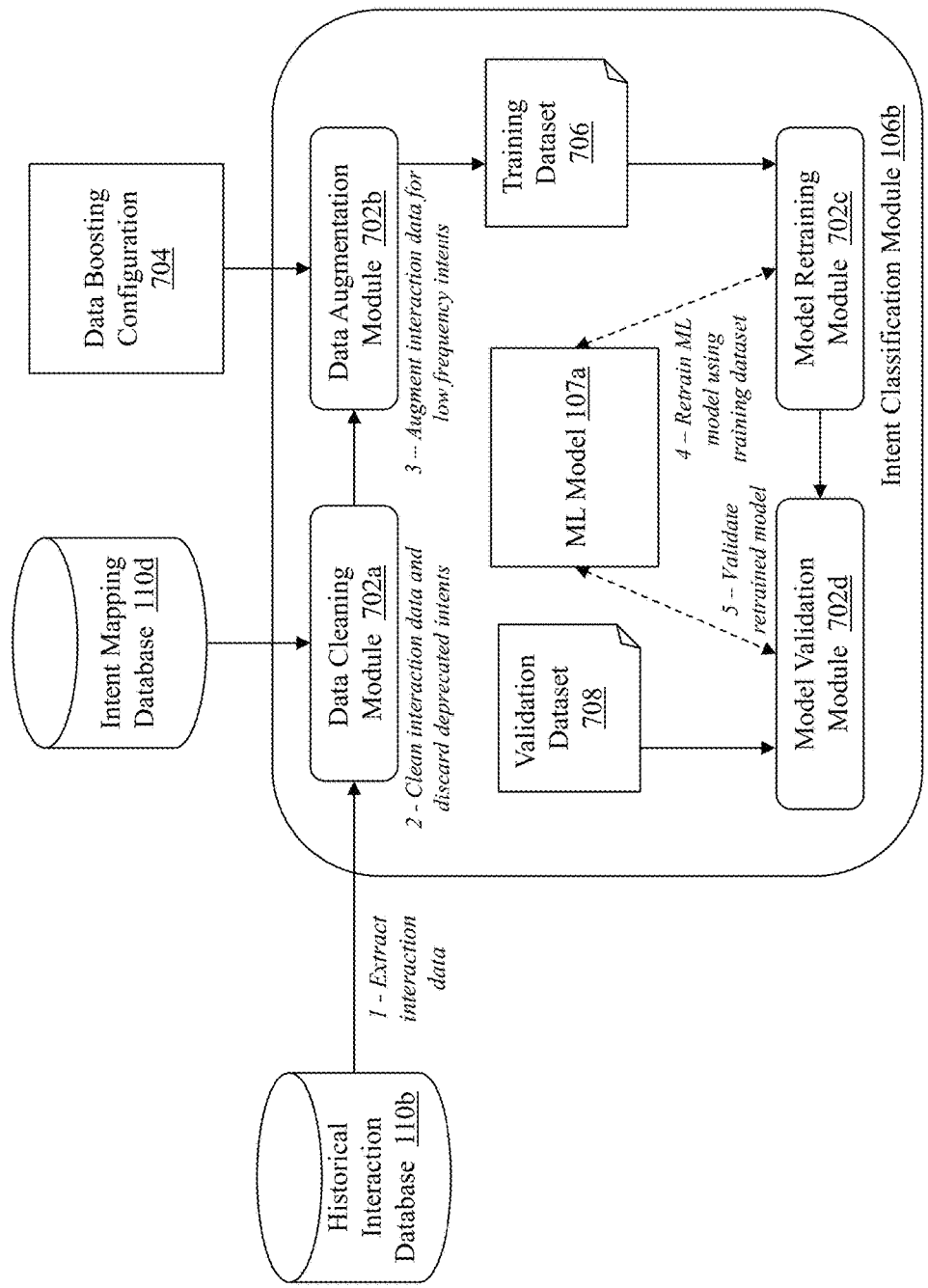
FIG. 7 is a diagram of an exemplary auto-trainable model pipeline for training or retraining an intent classification model.

FIG. 7 is a diagram of an exemplary auto-trainable model pipeline 700 for training intent classification model 107a. As shown in FIG. 7, intent classification module 106b comprises a plurality of computing modules: data cleaning module 702a, data augmentation module 702b, model retraining module 702c, and model validation module 702d. At step one, data cleaning module 702a extracts historical interaction data (e.g., chat logs from VA applications) from historical interaction database 110b. In some embodiments, the chat logs comprise unstructured text data corresponding to input messages provided from users of client computing devices 102, 103 and intent data determined by system 100 that corresponds to the input messages. At step two, data cleaning module 702a cleans the extracted interaction data (e.g., pre-processing to remove noise) and discards any deprecated intents that are associated with the interaction data. For example, as described above, intent mapping database 110d comprises all valid intents and mappings from each valid intent to one or more query suggestions; database 110d is updated as new products and service offerings are introduced. Due to changes to products and services over time, one or more intents that had previously been defined in intent mapping database 110d may no longer be used by or applicable to system 100 (e.g., based upon application functionality changes or product changes). Data cleaning module 702a can remove these deprecated intents from the historical interaction data prior to generating the training data set, so that the retrained model does not determine candidate intents that have been deprecated.

In addition, the historical interaction data for certain intents may be incomplete or insufficient to perform robust training of model 107a. At step 3, data augmentation module 702b augments the cleaned interaction data that is associated with intents for which we want to improve the performance of model 107a. For example, certain intents may be considered low-frequency intents (i.e., these intents are not determined to occur very often in the historical interaction data). Data boosting configuration 704 provides indicia of intents for which model performance should be improved, and module 702b applies one or more data augmentation techniques to the historical interaction data for the intents in configuration 704. In some embodiments, module 702b can employ a variety of techniques to produce similar meaning/ paraphrases of each record from the set of messages in the training data. These techniques include, but are not limited to, generating paraphrases with generative models, replacing certain words by their synonym words, swapping word orders, taking a word out to add noise to the data in order to improve robustness of ML model 107a. Data augmentation module 702b generates a training dataset 706 comprising the cleaned historical data (augmented where necessary for low-frequency intents) and corresponding intents.

At step 4, model retraining module 702c retrains ML model 107a using the training dataset 706. In some embodiments, module 702c produces updated artifacts for model 107a using the training dataset. Generally, model retraining is done using the training dataset 706. Intent classification module 106b builds a new model 107a by training the model on the training dataset 706 and module 106b validates the new model's performance on the validation dataset 708. In this process, multiple artifacts are generated: i) a TF-IDF Vectorizer (such as the sklearn.feature_extraction.text.T-fidfVectorizer class implemented in the scikit-learn 1.3.0 library for Python) is trained on the training dataset 706 and is used to convert virtual assistant logs from text format to a vector form, which is stored as binary file to be used in later steps; ii) a Label Encoder is trained on intents present in training dataset 706; the Label Encoder (such as the sklearn.preprocessing.LabelEncoder class implemented in scikit-learn 1.3.0) learns the mapping of intents in text form to their numerical representation, which is stored as binary file to be used in later steps; iii) for training model 107a, all typed user queries in training dataset 706 are converted to a vector form using the TF-IDF Vectorizer and intents are converted to their numerical representation using the Label Encoder. This processed training dataset is used to train model 107a. After training the model, model weights are stored in a binary file to be used in later steps.

At step 5, model validation module 602d validates the updated artifacts generated for ML model 107a using validation dataset 608. In some embodiments, validation dataset 608 comprises historical interaction data and corresponding intents that have been confirmed as accurate for the related interactions. Module 602d executes the updated model artifacts using the validation dataset 606 to determine whether the updated model is accurately predicting intents (e.g., by comparing the intents predicted by the updated model for each interaction to the known intents in the validation data set for those interactions). Depending upon the accuracy exhibited by the updated model artifacts, model validation module 602d can initiate deployment of the updated ML model 107a to a production environment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for automatic intelligent query suggestion for information retrieval applications, the system comprising a server computing device having a memory for storing computer-executable instructions and a processor that executes the computer-executable instructions to:
   a) determine a plurality of candidate intents associated with user input text received from a remote computing device, including applying a trained intent classification model to the user input text to predict one or more of the candidate intents;
   b) calculate a likelihood value for each of the plurality of candidate intents;
   c) compile suggested queries based upon the plurality of candidate intents and associated likelihood values, wherein each of the suggested queries comprises a text string that starts with one or more different words than the user input text, the compiling comprising:
      identifying, for each candidate intent, one or more queries that are mapped to the candidate intent;
      assigning a ranking value to each of the identified queries based upon (i) a text similarity measure with the user input text and (ii) the likelihood value for the corresponding candidate intent; and
      sorting the suggested queries using the ranking value to compile the suggested queries;
   d) identify one or more of the suggested queries for display on the remote computing device; and
   upon detecting an update to the user input text at the remote computing device, repeat steps a) to d) using the updated user input text, or
   upon detecting a selection of one of the suggested queries at the remote computing device, retrieve content responsive to the selected query for display on the remote computing device.

2. The system of claim 1, wherein determining a plurality of candidate intents comprises:
identifying one or more prior interactions between the user of the remote computing device and one or more information retrieval applications;
inferring one or more intents associated with the prior interactions; and
incorporating the inferred intents into the plurality of candidate intents.

3. The system of claim 2, wherein calculating a likelihood value for each of the plurality of candidate intents comprises:
predicting a likelihood value for each candidate intent by executing a trained intent likelihood prediction model using the plurality of candidate intents as input to generate the likelihood values.

4. The system of claim 1, wherein determining a plurality of candidate intents comprises:
identifying one or more intents associated with interactions between one or more information retrieval applications and other users; and
incorporating the identified intents into the plurality of candidate intents.

5. The system of claim 4, wherein calculating a likelihood value for each of the plurality of candidate intents comprises:
predicting a likelihood value for each candidate intent by executing a trained intent likelihood prediction model using the plurality of candidate intents as input to generate the likelihood values.

6. The system of claim 1, wherein the likelihood value for each of the plurality of candidate intents represents a likelihood that the candidate intent matches an actual intent of the user of the remote computing device.

7. The system of claim 1, wherein identifying one or more suggested queries for display on the remote computing device comprises:
selecting one or more of the suggested queries based upon the ranking value;
generating a user interface element comprising the selected suggested queries; and
transmitting the user interface element to the remote computing device.

8. The system of claim 1, wherein the server computing device automatically retrains the trained intent classification model.

9. The system of claim 8, wherein retraining the trained intent classification model comprises:
generating a training data set using (i) historical interactions associated with one or more information retrieval applications and (ii) active intent information;
retraining the trained intent classification model using the training data set; and
validating the retrained intent classification model using a validation data set.

10. The system of claim 9, wherein generating the training data set comprises augmenting the historical interactions to include synthetically-generated interactions by:
i) generating paraphrases of one or more historical interactions;
ii) replacing one or more words in a historical interaction with synonym words;
iii) swapping an order of one or more words in a historical interaction; and
iv) removing one or more words from a historical interaction.

11. The system of claim 1, wherein the user input text comprises an incomplete text string and the update to the user input text comprises an addition to the incomplete text string.

12. The system of claim 1, wherein the content responsive to the selected query comprises a webpage for display in a browser application on the remote computing device.

13. The system of claim 12, wherein the server computing device redirects the browser application to the webpage upon detecting the selection of one of the suggested queries at the remote computing device.

14. The system of claim 1, wherein steps a) to d) occur in real time as updates to the user input text are detected at the remote computing device.

15. A computerized method of automatic intelligent query suggestion for information retrieval applications, the method comprising:
a) determining, by a server computing device, a plurality of candidate intents associated with user input text received from a remote computing device, including applying a trained intent classification model to the user input text to predict one or more of the candidate intents;
b) calculating, by the server computing device, a likelihood value for each of the plurality of candidate intents;
c) compiling, by the server computing device, suggested queries based upon the plurality of candidate intents and associated likelihood values, wherein each of the suggested queries comprises a text string that starts with one or more different words than the user input text, the compiling comprising:
identifying, for each candidate intent, one or more queries that are mapped to the candidate intent;
assigning a ranking value to each of the identified queries based upon (i) a text similarity measure with the user input text and (ii) the likelihood value for the corresponding candidate intent; and
sorting the suggested queries using the ranking value to compile the suggested queries;
d) identifying, by the server computing device, one or more suggested queries for display on the remote computing device; and
upon detecting an update to the user input text at the remote computing device, the server computing device repeats steps a) to d) using the updated user input text, or
upon detecting a selection of one of the suggested queries at the remote computing device, the server computing device retrieves content responsive to the selected query for display on the remote computing device.

16. The method of claim 15, wherein determining a plurality of candidate intents comprises:
identifying one or more prior interactions between the user of the remote computing device and one or more information retrieval applications;
inferring one or more intents associated with the prior interactions; and
incorporating the inferred intents into the plurality of candidate intents.

17. The method of claim 16, wherein calculating a likelihood value for each of the plurality of candidate intents comprises:
predicting a likelihood value for each candidate intent by executing a trained intent likelihood prediction model using the plurality of candidate intents as input.

18. The method of claim 15, wherein determining a plurality of candidate intents comprises:
identifying one or more intents associated with interactions between one or more information retrieval applications and other users; and
incorporating the identified intents into the plurality of candidate intents.

19. The method of claim 18, wherein calculating a likelihood value for each of the plurality of candidate intents comprises:
predicting a likelihood value for each candidate intent by executing a trained intent likelihood prediction model using the plurality of candidate intents as input to generate the likelihood values.

20. The method of claim 15, wherein the likelihood value for each of the plurality of candidate intents represents a likelihood that the candidate intent matches an actual intent of the user of the remote computing device.

21. The method of claim 15, wherein identifying one or more suggested queries for display on the remote computing device comprises:
selecting one or more of the suggested queries based upon the ranking value;
generating a user interface element comprising the selected suggested queries; and
transmitting the user interface element to the remote computing device.

22. The method of claim 15, wherein the server computing device automatically retrains the trained intent classification model.

23. The method of claim 22, wherein retraining the trained intent classification model comprises:
generating a training data set using (i) historical interactions associated with one or more information retrieval applications and (ii) active intent information;
retraining the trained intent classification model using the training data set; and
validating the retrained intent classification model using a validation data set.

24. The method of claim 23, wherein generating the training data set comprises augmenting the historical interactions to include synthetically-generated interactions by:
i) generating paraphrases of one or more historical interactions;
ii) replacing one or more words in a historical interaction with synonym words;
iii) swapping an order of one or more words in a historical interaction; and
iv) removing one or more words from a historical interaction.

25. The method of claim 15, wherein the user input text comprises an incomplete text string and the update to the user input text comprises an addition to the incomplete text string.

26. The method of claim 15, wherein the content responsive to the selected comprises a webpage for display in a browser application on the remote computing device.

27. The method of claim 26, wherein the server computing device redirects the browser application to the webpage upon detecting the selection of one of the suggested queries at the remote computing device.

28. The method of claim 15, wherein steps a) to d) occur in real time as updates to the user input text are detected at the remote computing device.

\* \* \* \* \*

UNITED STATES PATENT AND TRADEMARK OFFICE
CERTIFICATE OF CORRECTION

PATENT NO. : 12,174,864 B1
APPLICATION NO. : 18/374165
DATED : December 24, 2024
INVENTOR(S) : Sachin Umrao et al.

Page 1 of 2

It is certified that error appears in the above-identified patent and that said Letters Patent is hereby corrected as shown below:

In the Specification

Column 5, Line 65 reads:
"Although modules 106a-106c, 108 and models 107a-"
Should read:
--Although modules 106a-106e, 108 and models 107a- --

Column 8, Line 65 reads:
"tion FAQ." and so forth."
Should read:
--tion FAQ," and so forth.--

Column 9, Line 27 reads:
""Applying." system 100 can repeat the steps for determining"
Should read:
--"Applying," system 100 can repeat the steps for determining--

Column 13, Line 40 reads:
"modules 106a-106d. 108 repeat (step 212) the process of"
Should read:
--modules 106a-106d, 108 repeat (step 212) the process of--

Column 14, Line 7 reads:
"example, module 106o can determine that content respon-"
Should read:
--example, module 106e can determine that content respon- --

Column 14, Line 8 reads:
"sive to the selected query includes a webpage. Module 106c"

Signed and Sealed this
First Day of April, 2025

Coke Morgan Stewart
*Acting Director of the United States Patent and Trademark Office*

Should read:

--sive to the selected query includes a webpage. Module 106e--